(12) United States Patent
Reed

(10) Patent No.: US 8,207,697 B1
(45) Date of Patent: Jun. 26, 2012

(54) POSITIONING WORK STOP

(76) Inventor: Daniel Reed, Pleasant Plain, OH (US)

(*) Notice: Subject to any disclaimer, the term of this patent is extended or adjusted under 35 U.S.C. 154(b) by 685 days.

(21) Appl. No.: 12/284,085

(22) Filed: Sep. 18, 2008

(51) Int. Cl.
*B23Q 15/14* (2006.01)

(52) U.S. Cl. .................... 318/652; 318/475; 318/490

(58) Field of Classification Search .............. 318/626, 318/652, 445, 466–468, 475, 480, 490, 519, 318/558
See application file for complete search history.

(56) References Cited

U.S. PATENT DOCUMENTS

| | | | | |
|---|---|---|---|---|
| 3,613,981 A | * | 10/1971 | Ramseier | 227/1 |
| 3,730,296 A | * | 5/1973 | Huigens | 192/134 |
| 3,849,669 A | * | 11/1974 | Weston | 307/154 |
| 3,958,479 A | * | 5/1976 | Leibinger | 83/209 |
| 4,023,084 A | * | 5/1977 | Owa | 318/603 |
| 4,246,577 A | * | 1/1981 | Shima et al. | 340/680 |
| 4,405,421 A | * | 9/1983 | Inoue | 205/645 |
| 4,678,976 A | * | 7/1987 | Inoue | 318/577 |
| 5,802,937 A | * | 9/1998 | Day et al. | 82/1.11 |
| 5,860,900 A | | 1/1999 | Dunning et al. | |
| 5,895,184 A | | 4/1999 | Walters et al. | |
| 6,140,931 A | * | 10/2000 | Yamane et al. | 340/686.6 |
| 6,543,973 B2 | | 4/2003 | Lapikas et al. | |
| 7,013,775 B1 | | 3/2006 | Song et al. | |
| 7,104,866 B2 | * | 9/2006 | Yamane et al. | 451/8 |
| 7,173,691 B2 | | 2/2007 | Murphy et al. | |
| 7,351,019 B2 | | 4/2008 | Bosker et al. | |

* cited by examiner

*Primary Examiner* — Bentsu Ro
(74) *Attorney, Agent, or Firm* — Mark F. Smith; Smith Brandenburg Ltd.

(57) ABSTRACT

The present invention is a positioning work stop for use with a machine tool for and having a signaling means that operates as a placement indicator effective for providing a signal if the work piece to be machined is in its proper position for machining or for signaling if the work piece has shifted out of position for machining. In a preferred embodiment of the invention the positioning work stop comprises a stop member having a stop surface, a switch element, a signaling means, and a power supply that are electrically coupled such that the signaling means activates when the work piece makes contact with the stop surface and operates as a placement indicator effective for providing a signal if the work piece to be machined is in its proper position for machining or for signaling if the work piece has shifted out of position for machining.

16 Claims, 6 Drawing Sheets

US 8,207,697 B1

POSITIONING WORK STOP

BACKGROUND OF THE INVENTION

The present invention is directed to a positioning work stop and more particularly to a positioning work stop for use with a machine tool in performing a precision machining operation and which informs the operator that the work piece is in its proper position for machining.

Computerized numerical controls (CNC) and other well known machine tools are used to perform various machining operations. Before a machining operation can be performed, the work piece to be machined must be properly positioned and held in place in a mounting fixture for positioning the work piece at a desired location relative to the machining tool. This is particularly important when the machining process is being performed on a CNC machine where the position of the work piece must align with the zero reference point programmed into the computer controls. A number of conventional positioning stops have been developed to accomplish the task of ensuring that the work piece is properly positioned.

Most such positioning work stops are relatively simple, manually operated devices whereby the machine operator installs the stop at a desired location and orientation, and sets the stop mechanism. When the work piece is placed in the mounting fixture and the surface makes contact with the stop, the machine operator knows that the work piece is in its proper position for machining. Unfortunately, work pieces often are jarred during setup or processing and slightly shift position and may no longer be in its proper position for machining. This is particularly problem some when machining highly precision parts.

Accordingly, there is a need for a positioning work stop that can be used with conventional positioning fixtures and operates to inform the machine operator that the work piece is in its proper position for machining and inform the machine operator if the work piece shifts out of its proper position and is no longer properly positioned on the positioning fixture.

SUMMARY OF THE INVENTION

The present invention is a positioning work stop for use with a machine tool for and having a signaling means that operates as a placement indicator effective for providing a signal if the work piece to be machined is in its proper position for machining or for signaling if the work piece has shifted out of position for machining.

A preferred embodiment of the invention is a positioning work stop for use with a machine tool comprising a signaling means for providing a signal when the work piece is in its proper position for machining operation with the machine tool.

In a preferred embodiment of the invention the signaling means comprises a light source for providing a visual signal.

In another preferred embodiment of the invention the signaling means comprises an audio source for providing an audio signal.

In another preferred embodiment of the invention the positioning work stop is removably attached to the positioning fixture.

In another preferred embodiment of the invention the positioning work stop for use with a machine tool for performing a machining operation on a work piece, the work stop comprises a stop member having a stop surface extending outwardly therefrom, a switch element, and a signaling means, wherein the signaling means activates when the work piece makes contact with the stop surface.

In another preferred embodiment of the invention the signaling means comprises a light source for providing a visual signal.

In another preferred embodiment of the invention the signaling means comprises an audio source for providing an audio signal.

In another preferred embodiment of the invention the switch element comprises a stop member extending outwardly from a housing and an electric connector means mechanically connected to the stop member and electrically connected to the signaling means such that in operation when the work piece is in contact with the stop member the signaling means provides a visual or an audio signal.

In another preferred embodiment of the invention the housing is electrically connected to the signaling means and wherein the electric connector means comprises a flexible cantilever having an electrically uninsulated end that is adapted to be urged against the housing when the work piece makes contact with the stop surface and activate the signaling means.

In another preferred embodiment of the invention the positioning work stop further comprises a power source for providing electric power to the signaling means.

In another preferred embodiment of the invention the switch element comprises a transmitter for transmitting a signaling to the a signaling member which activates to indicate that the work piece is in its proper position for machining.

In another preferred embodiment of the invention the power source is a rechargeable power source.

Other aspects, advantages, and embodiments of the invention will be apparent from the following description, the accompanying drawings and the appended claims.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention is a positioning work stop for use with a machine tool which is effective for providing a signal indicating if the work piece to be machined is in its proper position for machining or for indicating if the work piece has shifted out of position for machining. Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
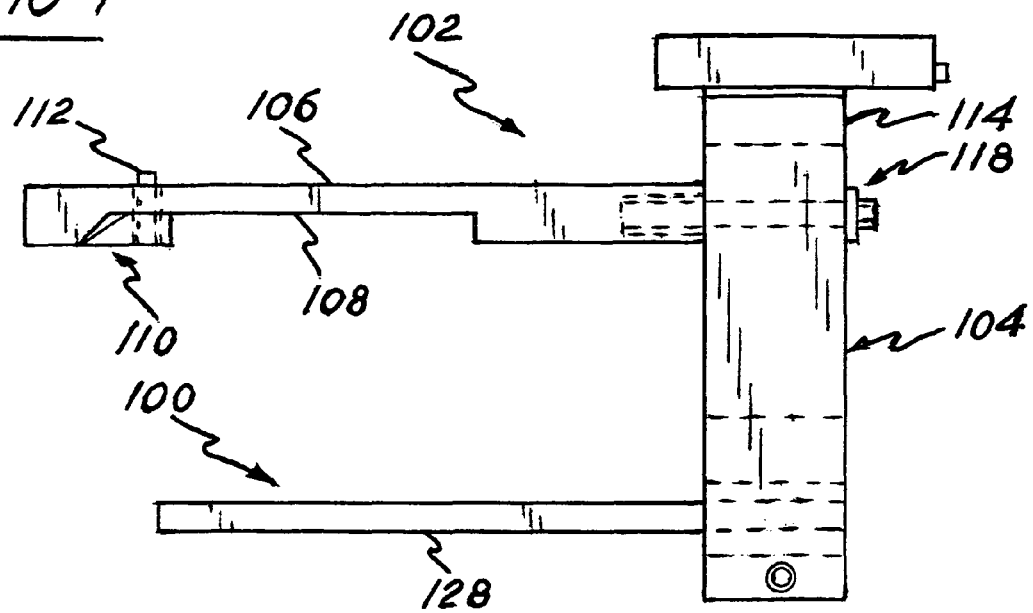
FIG. 1 is a top plan view of a positioning fixture having a preferred embodiment of the positioning work stop of the present invention incorporated therein.
Figure 2:
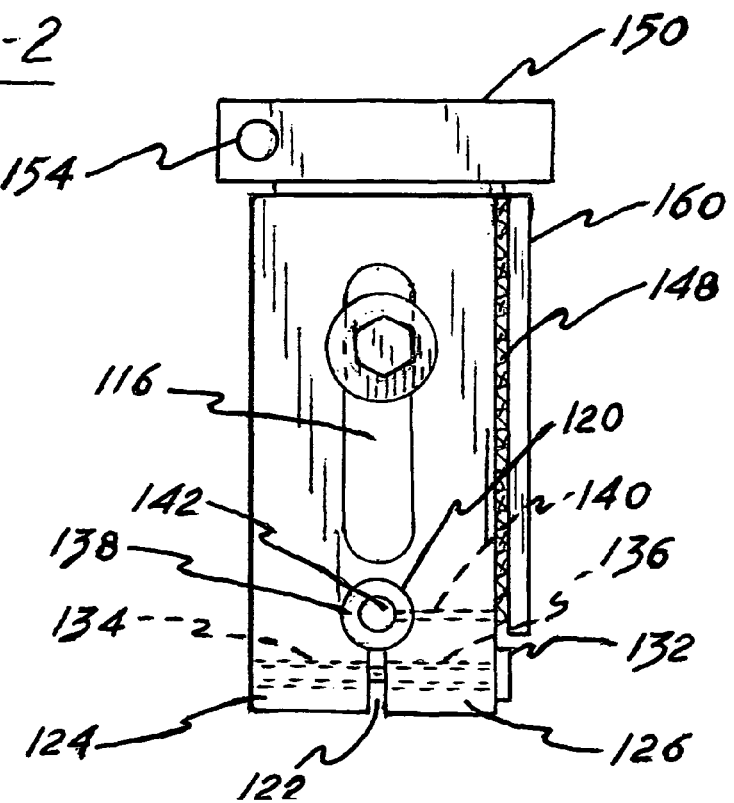
FIG. 2 is a side view of the positioning fixture of FIG. 1.
Figure 3:
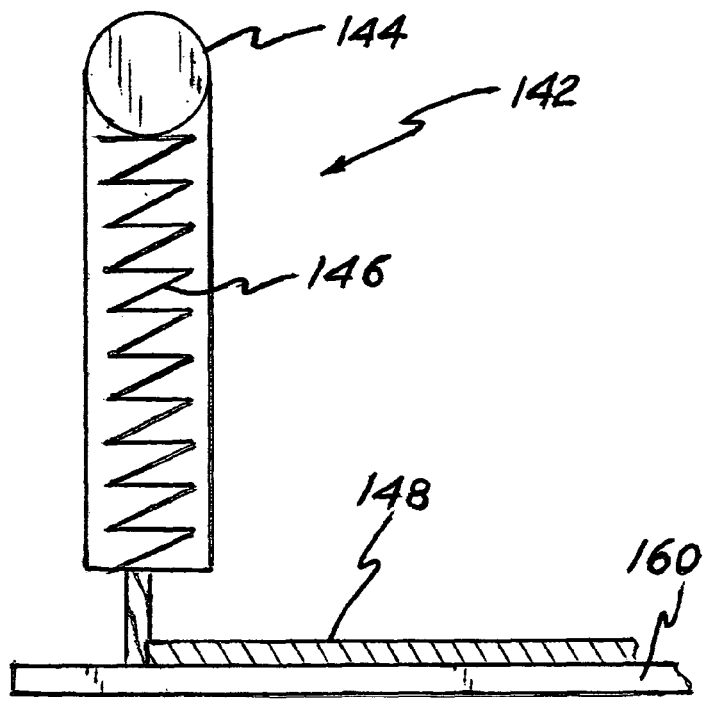
FIG. 3 is a schematic illustration of a switch element effective for electrically coupling the stop member to the power supply for energizing the signaling means to provide a signal to the machine operator indicating that the work piece is in its proper position.
Figure 4:
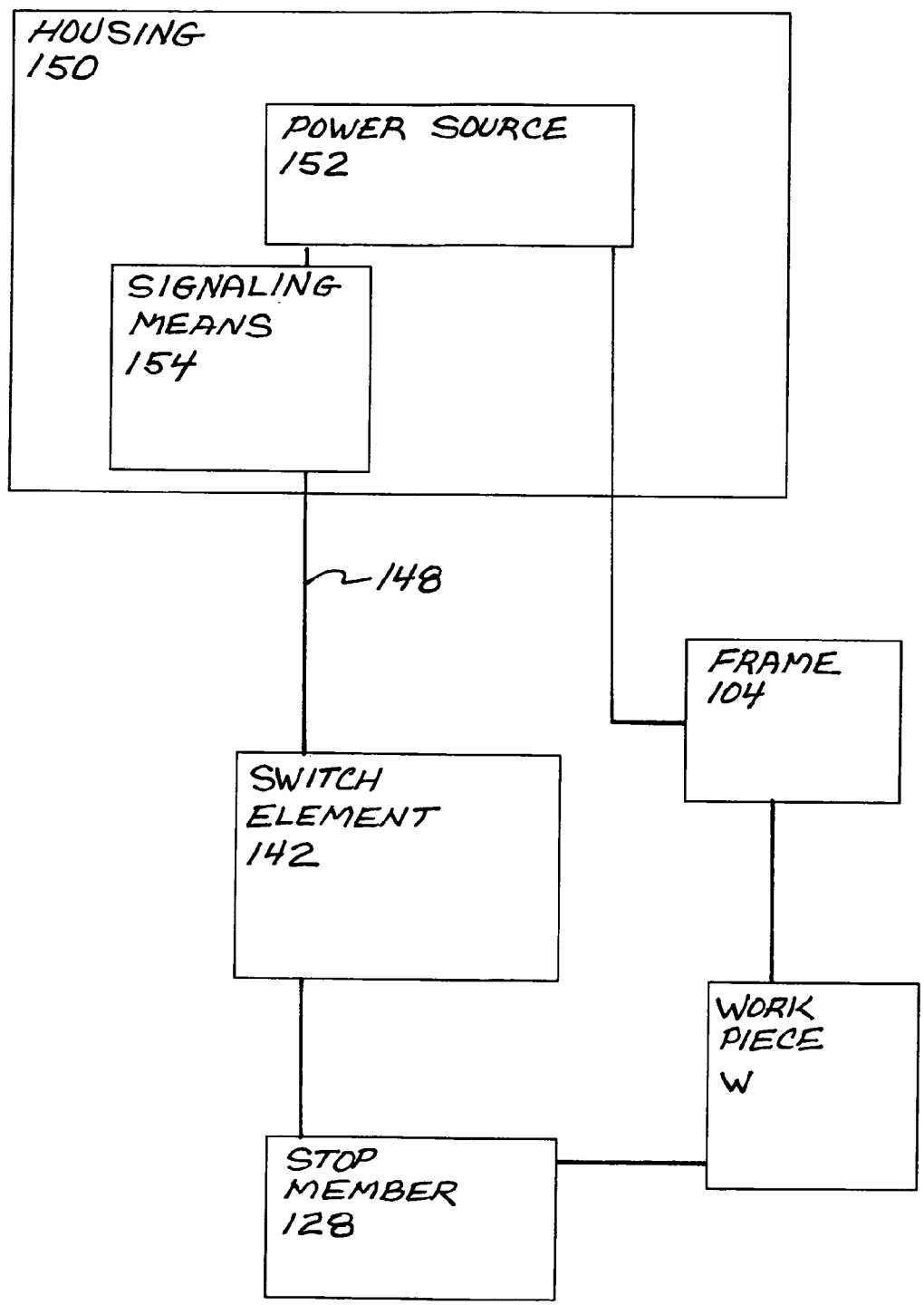
FIG. 4 is an electrical schematic illustration of the positioning work stop of FIG. 1.

In a preferred embodiment of the invention, as shown in FIGS. 1 and 2, a preferred embodiment of the positioning work stop 100 is shown incorporated into a positioning fixture 102 and comprises a electrically conducting frame 104 having a first shaft 106 with a flat section 108 and a mount 110 attached to the first shaft 106 by a bolt 112 which cooperate together for effectively mounting the positioning fixture 102 to a conventional securing mechanism (not shown). A second shaft 114 having a vertically extending slot 116 cooperates with the first shaft 106 and a washer and screw 118 operate to adjustably mount and secure in place the second shaft 114 to the first shaft 106 such that said second shaft 114 is mounted relatively perpendicular to the first shaft 106. As shown, one end of the second shaft 114 is provided with an aperture 120 having a slot 122 extending from the aperture 120 outwardly there from to form first and second cantilever sections 124 and 126, respectfully. An elongated electrically conductive stop member 128 is adjustably mounted to the second shaft 114 through the aperture 120 and secured in place by a screw 132 extending through apertures 134 and 136 in first and second cantilever sections 124 and 126, respectfully which operates to reduce the diameter of aperture 120 and tighten and secure stop member 128 in place with respect to the second shaft 114. Aperture 120 is provided with a concentric insulator 138 that operates to electrically insulate electrically conductive stop member 128 from second shaft 114 and includes an aperture 140 for receiving a switch element 142. Referring to FIG. 3, switch element 142 includes an electrically conductive contact 144 that is biased outwardly by biasing member 146 such as a electrically conductive spring provided between conductive contact 144 and a conductive conduit 148 formed from a electric conducting material which is insulted from the frame 104 of the positioning fixture 102 and preferably protected by a shield 160. As shown in FIGS. 2 and 4, mounted to second shaft 114 is a housing 150 having a power source 152, such as a conventional power supply, a 120V electric plug, rechargeable or nonrechargeable battery pack, or other suitable means, and a signaling means 154 which is electrically coupled to the switch element 142 by the conductive conduit 148. As shown, signaling means 154 is electrically connected to one terminal of the power source 152 and the second terminal is electrically connected to the frame 104 of the positioning fixture 102.

In operation, the machine operator sets the stop member 128 in its proper position for placing the work piece by sliding the stop member 128 longitudinally through aperture 120 and then secures it in place by tightening screw 132. In place within aperture 120, stop member 128 operates to urge electrically conductive contact 144 inwardly thereby electrically coupling the stop member 128 to the power source 152 and the signaling means 154 through conductive conduit 148. When an electrically conductive work piece W is paced into its proper position and contacts stop member 128 it completes the electrical connection with the power source 152 and the signaling means 154, as shown in FIG. 4, thereby providing electric power to energize the signaling means 154.

It should be understood that the preferred embodiment of the positioning work stop of the subject invention can be incorporated in any similar positioning fixture and is operational with use with any work piece that is formed from electrically conductive material. It should also be understood that the preferred embodiment of the positioning work stop of the subject invention provides a means for allowing the machine operator to know when the work piece is in its proper position for machine and will also allow the machine operator to know if the work piece is no longer in contact with the stop member and hence is no longer in its proper position for machining.

Figure 5:
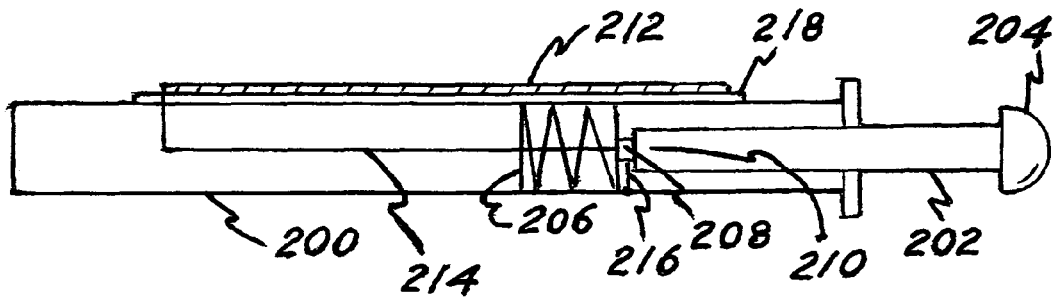
FIG. 5 is another preferred embodiment of the positioning work stop of the present invention showing an elongated rod for activating a switch when the work piece is in its proper position for machining.

In another preferred embodiment of the invention, as shown in FIG. 5, the stop member 128, as shown in FIG. 1 is replaced by stop member 200 of the subject invention. As shown the stop member 200 is elongated and includes an elongated rod 202 disposed therein and slidably secured within the elongated stop member 200 and includes a rounded contact surface 204 extending outwardly from the elongated stop member 200. Preferably the elongated rod 202 is biased outwardly from the stop member 200 by a biasing member 206, such as a spring or another equivalent structure (such as for an example a block of compressible elastomeric material or molded plastic spring element). A conventional micro switch 208 is mounted to the inner end 210 of the elongated rod 202 and is positioned between the inner end 210 and the biasing member 206. As shown, one terminal of the micro switch 208 is electrically coupled to a electrical conduit 212 such as through a wire 214 and the second terminal of the micro switch 208 is electrically coupled to the surface 220 of the stop member 200 such as by a wire 216. The electrical conduit 212 is electrically insulated from the surface 220 of stop member 200 by a insulation layer 218.

Figure 6:
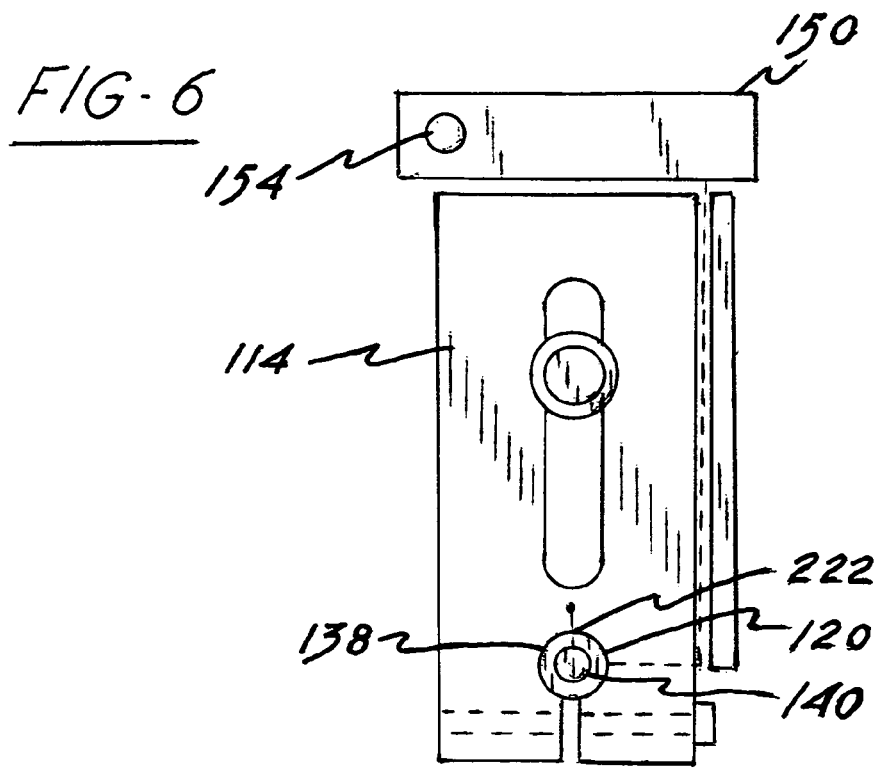
FIG. 6 is a side view of the positioning fixture of FIG. 5.
Figure 7:
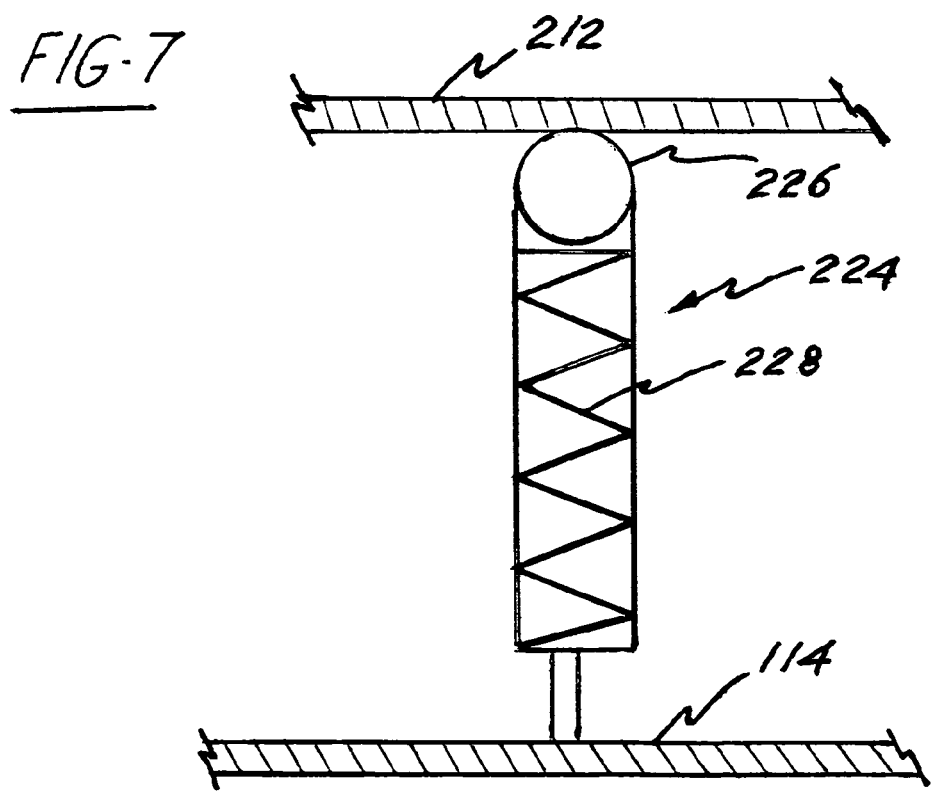
FIG. 7 is a schematic illustration of a second switch element which is adapted to be in alignment with and in contact with electric conduit positioned along the surface of the work stop.

Referring to FIGS. 6 and 7, aperture 120 of the second shaft 114 is provided with a concentric insulator 138 that operates to electrically insulate electrically conductive stop member 200 from second shaft 114 and includes an aperture 140 for receiving a switch element 142 (FIG. 3). As previously described in reference to FIG. 3, switch element 142 includes an electrically conductive contact 144 that is biased outwardly by biasing member 146 such as a electrically conductive spring provided between conductive contact 144 and a conductive conduit 148 formed from a electric conducting material which is insulted from the frame 104 of the positioning fixture 102 and preferably protected by a shield 160. Concentric insulator 138 is provided with a second aperture 222 that includes a second switch element 224 (FIG. 7) which is adapted to be in alignment with and in contact with electrical conduit 212. As shown in FIG. 7, the second switch element 224 includes an electrically conductive element 226 that is biased outwardly by biasing member 228 such as an electrically conductive spring provided between conductive element 226 and second shaft 114 of frame 104.

Figure 8:
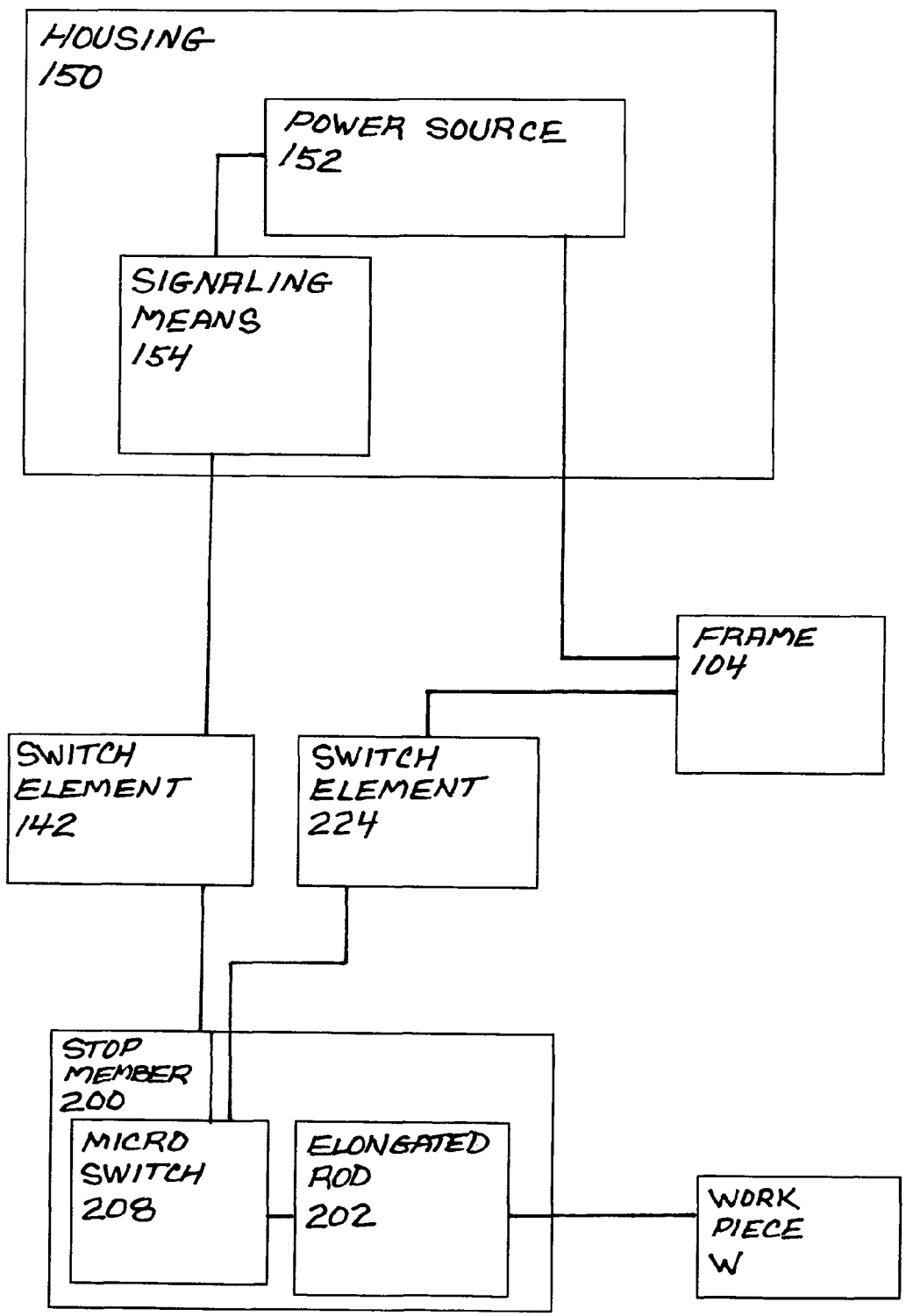
FIG. 8 is a electrical schematic illustration showing the positioning work stop of FIG. 5.

As shown in FIGS. 6 and 8, mounted to second shaft 114 is a housing 150 having a power source 152, such as a conventional power supply, a 120V electric plug, rechargeable or nonrechargeable battery pack, or other suitable means, and a signaling means 154 which is electrically coupled to the switch element 142 by the conductive conduit 148. As shown, signaling means 154 is electrically connected to one terminal of the power source 152 and the second terminal is electrically connected to the frame 104 of the positioning fixture 102.

In operation, the machine operator sets the stop member 200 in its proper position for placing the work piece by sliding the stop member 200 longitudinally through aperture 120 and then secures it in place by tightening screw 132 (FIG. 1). The work piece W is then positioned in its proper position for machining such that it makes contact with the contact surface 204 of the elongated rod 202 such that the elongated rod 202 is pressed inwardly thereby exerting a force on the such that the elongated rod 202 is pressed inwardly thereby exerting a force on the micro switch 208 that operates to make an electrical connection between wire 214 and electrical conduit 212 and wire 216 and surface 220 of stop member 200. In place within aperture 120, stop member 200 is then electrically coupled to the frame 102 through second switch element 224 for electrically coupling the electrical conduit 212 to second shaft 114 of frame 104 and complete the electrical connection with the power source 152 and the signaling means 154 thereby providing electric power to energize the signaling means 154.

Figure 9:
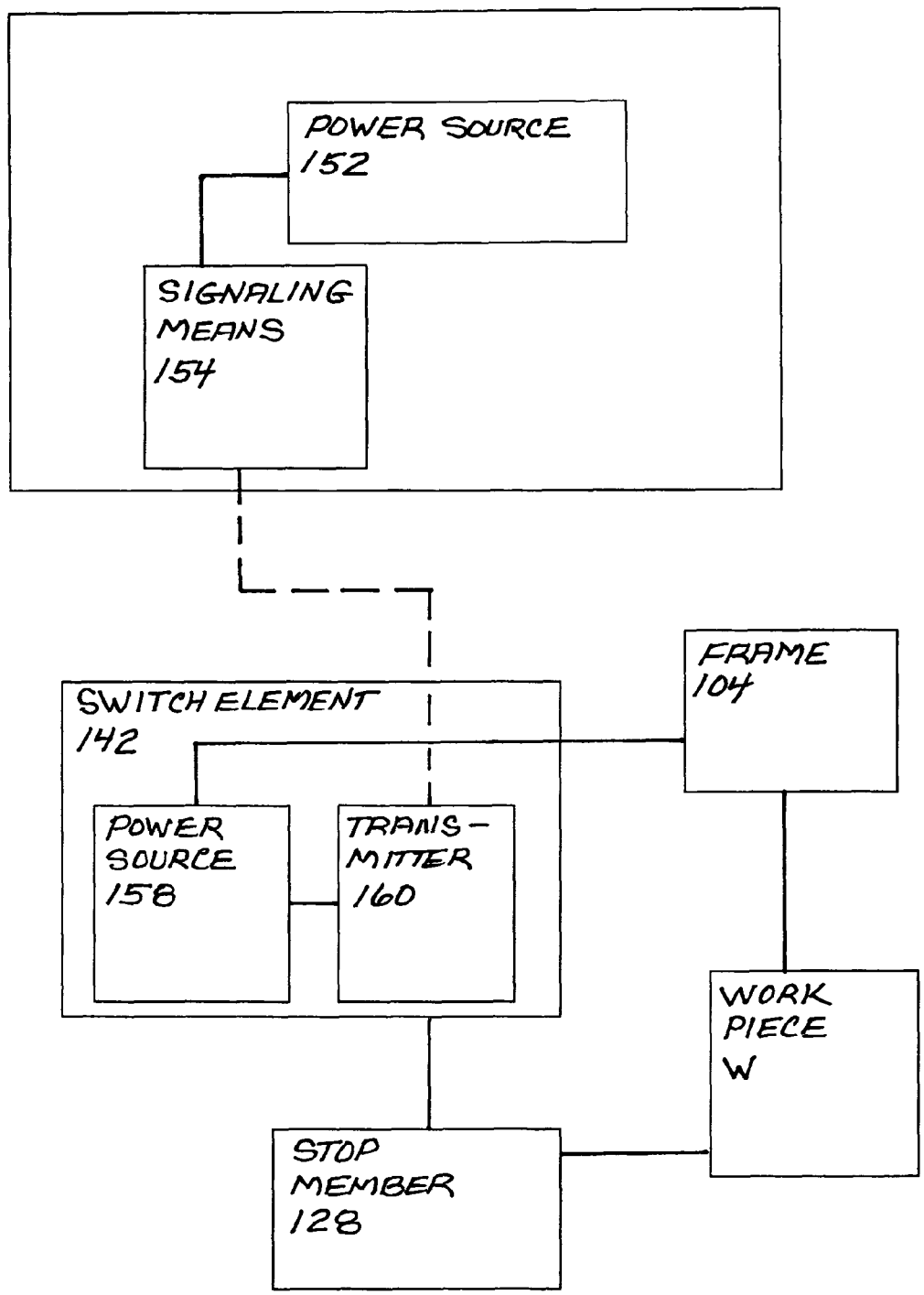
FIG. 9 is a electrical schematic illustration of another preferred embodiment if the invention showing the signaling means comprising a transmitter to transmitting a signal to the signaling means to activate the signaling means.

The position work stop of the present invention provides a signaling means is electrically coupled to the stop member such that when the work piece makes contact with the stop member the signaling means is energized by the power supply and provides a signal, such as a visible or audio signal, to alert the machine operator that the work piece is in its proper position for machining. It should be understood that in another preferred embodiment of the invention as shown in FIG. 9, the switch element 142 may further comprises a power source 158, such as a battery, and a transmitter 160 that transmits an electrical signal, such as a radio signal, to the signaling means 154 that operates to activate the signaling means 154 to produce a signal to inform the machine operator that the work piece is in its proper position for machining. As shown, the power source 158 is electrically coupled to the transmitter 160 and to the frame 104 such that when the work piece W contacts stop member 128 the transmitter 160 is electrically energized and transmits a signal to the signaling means 154 which operates to inform the machine operator that the work piece W is in contact with the stop member 128.

As described and shown herein, the positioning work stop for use with a machine tool offers significant advantages over other positioning work stops. The signaling means operates as a placement indicator that is effective for providing a signal if the work piece to be machined is in its proper position for machining or for signaling if the work piece has shifted out of position for machining. This significantly reduces the labor associated with ensuring the proper placement of the work piece and ensuring that the work piece has not shifted out of proper placement prior to and during the machining operation. Further, the embodiments described herein provides a positioning work stop that does not require any exposed wires, is relatively inexpensive to manufacture, and is simple and easily installed on a conventional positioning fixture.

I claim:

1. A positioning work stop for informing a machine tool operator that a work piece is in proper position for machining, the positioning work stop comprising a stop member for contacting the work piece when the work piece is in proper position for machining and a signaling means for providing a signal when the work piece makes contact with said stop member and provides a signal to the machine tool operator if the work piece is no longer in its proper position during machining.

2. The positioning fixture of claim 1 wherein said signaling means comprises a light source for providing a visual signal.

3. The positioning fixture of claim 1 wherein said signaling means comprises an audio source for providing an audio signal.

4. The positioning fixture of claim 1 wherein said positioning work stop is removably attached to a positioning fixture.

5. The positioning fixture of claim 1 wherein said stop member is electrically coupled to said signaling means and to a power supply through a positioning fixture.

6. A positioning work stop for a machine tool for use by an operator in performing a machining operation on an electrically conductive work piece, the work stop comprising:
    an elongated electrically conductive stop member;
    an electrical power source;
    a signaling means electrically coupled to said stop member;
    wherein contact of said stop member with the work piece operates to couple said electrical power source and said signaling means to energize said signaling means and provide a signal to the operator when the work piece is in position for machining and if the work piece shifts out of position during machining.

7. The positioning work stop of claim 6 wherein said signaling means comprising a light source for providing a visual signal.

8. The positioning work stop of claim 6 wherein said signaling means comprises an audio source for providing an audio signal.

9. The positioning work stop of claim 6 further comprising a switch element having an electric connector means mechanically coupled to said stop member and electrically coupled to said signaling means such that in operation when the work piece is in contact with said stop member said signaling means provides a visual or an audio signal.

10. The positioning work stop of claim 9 wherein said electric connector means comprises a flexible cantilever having an electrically uninsulated end that is adapted to be electrically coupled to said signaling means when the work piece makes contact with said stop surface.

11. The positioning work stop of claim 6 wherein said power source is a rechargeable power source.

12. A positioning work stop for use with a positioning fixture for a machine tool for performing a machining operation on a work piece, the work stop comprising:
    a stop member having a stop surface;
    a switch element;
    a signaling means; and
    a power supply;
    wherein said switch element, said signaling means and said power supply are electrically coupled such that said signaling means activates when the work piece makes contact with said stop surface and operates as a placement indicator effective for providing a signal if the work piece to be machined is in its proper position for machining or for signaling if the work piece has shifted out of position for machining.

13. The positioning work stop of claim 12 wherein said signaling means comprises a light source for providing a visual signal.

14. The positioning work stop of claim 13 is removably attached to said positioning fixture.

15. The positioning work stop of claim 13 wherein said power supply comprises rechargeable batteries.

16. The positioning work stop of claim 12 wherein said signaling means comprises an audio source for providing an audio signal.

* * * * *